US012631869B2

(12) United States Patent
Qiu

(10) Patent No.: US 12,631,869 B2
(45) Date of Patent: May 19, 2026

(54) ENHANCED-IMAGE REFLECTIVE TELESCOPE

(71) Applicant: Light Speed Vision (Beijing) Co., Ltd., Beijing (CN)

(72) Inventor: Hongyun Qiu, Beijing (CN)

(73) Assignee: Light Speed Vision (Beijing) Co., Ltd., Beijing (CN)

( * ) Notice: Subject to any disclaimer, the term of this patent is extended or adjusted under 35 U.S.C. 154(b) by 0 days.

(21) Appl. No.: 19/181,641

(22) Filed: Apr. 17, 2025

(65) Prior Publication Data

US 2025/0334788 A1      Oct. 30, 2025

Related U.S. Application Data

(63) Continuation of application No. PCT/CN2024/082705, filed on Mar. 20, 2024.

(51) Int. Cl.
| | |
|---|---|
| *G02B 23/00* | (2006.01) |
| *G02B 23/04* | (2006.01) |
| *G02B 23/06* | (2006.01) |
| *G02B 23/12* | (2006.01) |

(52) U.S. Cl.
CPC ............. *G02B 23/04* (2013.01); *G02B 23/06* (2013.01); *G02B 23/12* (2013.01)

(58) Field of Classification Search
CPC ........ G02B 23/00; G02B 23/04; G02B 23/06; G02B 23/08; G02B 23/10; G02B 23/12; G02B 23/125; G02B 23/14
USPC .................................................. 359/399–435
See application file for complete search history.

(56) References Cited

U.S. PATENT DOCUMENTS

| | | | | |
|---|---|---|---|---|
| 6,317,262 B1 * | 11/2001 | Hardin | ................... | G02B 23/02 |
| | | | | 359/399 |
| 6,323,996 B1 * | 11/2001 | Watters | .................. | G02B 23/16 |
| | | | | 359/857 |
| 6,888,672 B2 * | 5/2005 | Wise | ...................... | G02B 17/08 |
| | | | | 359/744 |
| 7,911,687 B2 * | 3/2011 | Scholz | ................... | H04N 23/20 |
| | | | | 359/399 |
| 2004/0208595 A1 * | 10/2004 | Mok | .................. | H04B 10/1125 |
| | | | | 398/128 |
| 2005/0231720 A1 | 10/2005 | Goto | | |
| 2006/0103926 A1 * | 5/2006 | Meyers | .................. | G02B 23/16 |
| | | | | 359/399 |

FOREIGN PATENT DOCUMENTS

| | | |
|---|---|---|
| CN | 112731645 A | 4/2021 |
| CN | 112859322 A | 5/2021 |
| CN | 112987279 A | 6/2021 |

OTHER PUBLICATIONS

International Search Report received in corresponding International Patent Application No. PCT/CN2024/082705, mailed Aug. 8, 2024, 8 pages.

* cited by examiner

*Primary Examiner* — Thong Q Nguyen

(74) *Attorney, Agent, or Firm* — Cooper Legal Group, LLC

(57)      ABSTRACT

An enhanced-image reflective telescope includes a concave reflective primary mirror configured to reflect light onto a reflective secondary mirror, the reflective secondary mirror configured to reflect reflected light from the concave reflective primary mirror by 90 degrees into an eyepiece, a processor, a projection mechanism, the eyepiece, and a light collecting system.

4 Claims, 1 Drawing Sheet

ENHANCED-IMAGE REFLECTIVE TELESCOPE

CROSS-REFERENCE TO RELATED APPLICATION

This application is a continuation of PCT application serial no. PCT/CN2024/082705, filed on Mar. 20, 2024, the disclosure of which is incorporated by reference herein in its entirety.

TECHNICAL FIELD

The present application relates to a technical field of telescopes, and, in particular, to an enhanced-image reflective telescope.

BACKGROUND

A Newtonian reflective telescope is an optical telescope that uses a combination of a concave reflective primary mirror and a flat reflective secondary mirror to reflect light and form images. The Newtonian reflective telescope is widely used in popular science and educational telescopes due to its simple optical system and relatively low cost.

However, when observing celestial objects such as stars, deep-sky objects, artificial satellites, and other faint celestial bodies in solar system, observers often struggle to obtain more detailed information about the celestial bodies, such as their names, background knowledge, etc since these celestial bodies have fewer details and are relatively dim. In addition, due to a poor color recognition ability of human eyes for faint celestial bodies, the observers cannot fully understand colors of these celestial bodies.

SUMMARY

The present application provides an enhanced-image reflective telescope capable of mixed-reality (MR) image augmentation. This telescope enables display of enriched graphic and textual information of observed targets within a same observational field of view, or superimposes a color digital image of the target at its actual spatial position within the same observational field of view. Therefore, both image clarity and informational depth in telescopic observations are significantly improved, thereby enhancing public astronomy education and scientific outreach.

In a first aspect, an embodiment of the present application provides an enhanced-image reflective telescope, wherein the reflective telescope includes:

a concave reflective primary mirror configured to reflect observed light of the enhanced-image reflective telescope onto a reflective secondary mirror, the reflective secondary mirror configured to reflect reflected light from the concave reflective primary mirror by 90 degrees into an eyepiece, a processor, a projection mechanism, the eyepiece, and.

a light-collecting mechanism, where the reflective secondary mirror is configured to reflect light of a first wavelength range of the reflected light, and allow light of a second wavelength range of the reflected light to pass through the reflective secondary mirror, the light-collecting mechanism is configured to collect the light of the second wavelength range of the reflected light passing through the reflective secondary mirror, the processor is configured to receive the light of the second wavelength range of the reflected light from the light-collecting mechanism and process the light of the second wavelength range of the reflected light from the light-collecting mechanism into an image, the projection mechanism is configured to receive the image from the processor and project the image onto the reflective secondary mirror, and the eyepiece is configured to, after the image is reflected by the reflective secondary mirror onto the eyepiece, view both the light of the first wavelength range of the reflected light from the reflective secondary mirror and the image from the reflective secondary mirror.

The present application can achieve image enhancement of the telescopes, achieving a telescope effect of mixed-reality (MR) image augmentation, without generating additional incident light loss, and making the image observed through the telescopes clearer.

It should be understood that the content described in the summary is not intended to limit key or important features of the embodiments of the present application, nor limit the scope of the present application. Other features of the present application will become easily understood through the following description.

BRIEF DESCRIPTION OF THE DRAWINGS

Combining with the accompanying drawings and referring to the following detailed description, the above and other features, advantages, and aspects of various embodiment of the present application will become more apparent. In the accompanying drawings, the same or similar reference numerals indicate the same or similar elements.

DETAILED DESCRIPTION

In order to enable those skilled in the art to better understand the technical solutions in one or more embodiments of the description, the following will provide a clear and complete description of the technical solutions in one or more embodiments of the description in conjunction with the accompanying drawings. Obviously, the described embodiments are only a part of the embodiments of the description, not all of the embodiments. Based on one or more embodiments of the description, all other embodiments obtained by ordinary skilled in the art without creative labor should fall within the scope of protection of this document.

It should be noted that the description of the embodiments of the present application is only for a clearer explanation of the embodiments of the present application, the technical solutions do not constitute the limitation on the technical solutions provided by the embodiments of the present application.

Figure 1:
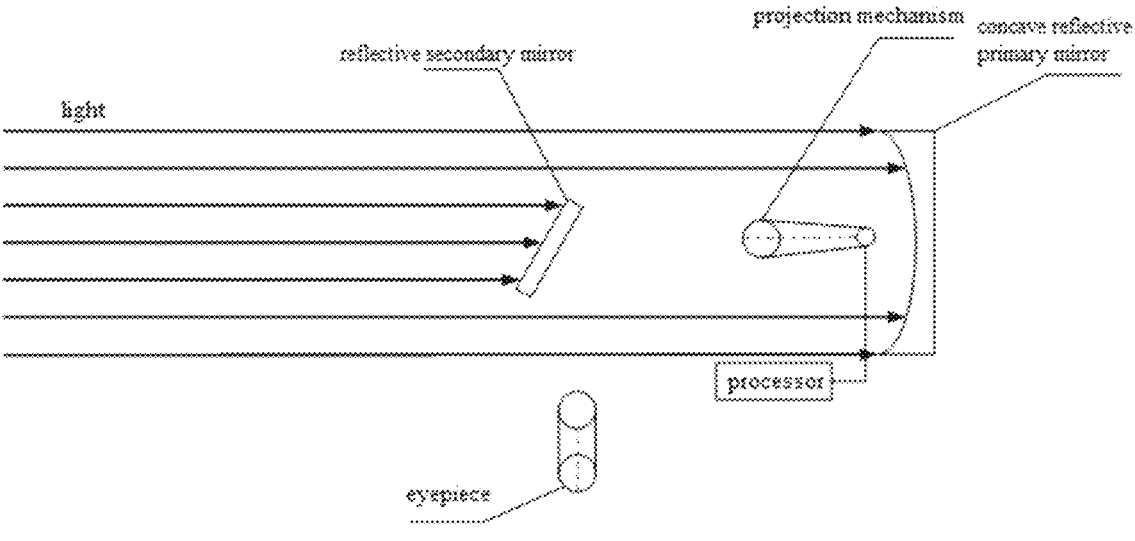
FIG. 1 is a schematic structure view of an enhanced-image reflective telescope according to an embodiment of the present application.

FIG. 1 is a schematic structure view of an enhanced-image reflective telescope according to an embodiment of the present application. Referring to FIG. 1, optionally, the reflective telescope may include:

a reflective secondary mirror, configured to deflect an optical axis by 90 degrees;

a concave reflective primary mirror, configured to reflect light onto the reflective secondary mirror;

a processor, configured to receive data for processing and output a processed image;

a projection mechanism, configured to receive the image output by the processor and project the image onto the reflective secondary mirror; and an eyepiece, configured to provide visual observation of an imaging of reflected light from the reflective secondary mirror.

Exemplarily, the processor has an external interface that can receive information from external devices, including but not limited to image data, telescope positioning data, and encoder data.

Optionally, the concave reflective primary mirror, the reflective secondary mirror and the projection mechanism are arranged along a same straight line, and the projection mechanism is located between the reflective secondary mirror and the concave reflective primary mirror, and oriented towards the reflective secondary mirror. The projection mechanism is located within a shadow area formed by the reflective secondary mirror under illumination, thereby avoiding interference with an original reflective optical path.

Exemplarily, the reflective secondary mirror may be provided at a 45-degree angle relative to the straight line where the concave reflective primary mirror, the projection mechanism, the reflective secondary mirror, and a light-collecting mechanism are located.

Optionally, the projection mechanism includes a microdisplay and a projection objective, wherein the projection objective is configured to project an image from the microdisplay towards the reflective secondary mirror, so that the reflective secondary mirror reflects the image onto an imaging focal plane of the concave reflective primary mirror.

Optionally, the projection mechanism further includes a focusing mechanism configured to align the projected image of the microdisplay and an imaging of the concave reflective primary mirror in an optical axis direction through focal tuning.

Optionally, a position of the reflective secondary mirror is adjusted so that the reflective secondary mirror ceases to reflect light into the eyepiece, the enhanced-image reflective telescope is configured to enable photographic capabilities, and thus the reflective telescope is converted to be a photography device. Therefore, the reflective telescope is enabled to achieve multifunctionality.

It should be noted that the projection mechanism and the reflective secondary mirror have relatively small volumes, and an obstruction of light can be ignored.

Exemplarily, an operating principle of the enhanced-image reflective telescope in this embodiment is as follows: the reflective secondary mirror is disposed at a middle of a barrel of the reflective telescope, the barrel receives natural light and converges the light onto the reflective secondary mirror, which transfers the light to the eyepiece, the projection mechanism receives the image output by the processor and projects the image onto the reflective secondary mirror, this allows the light reflected by the reflective secondary mirror to be superimposed, resulting in the image observed through the eyepiece being two superimposed enhanced images.

Figure 2:
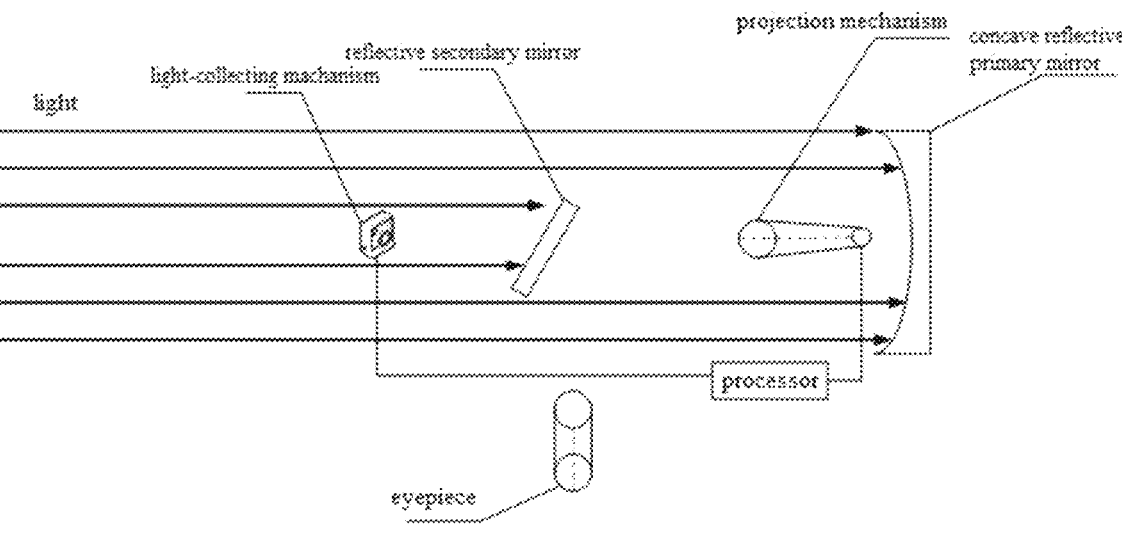
FIG. 2 is a schematic structure view of the enhanced-image reflective telescope according to another embodiment of the present application.

FIG. 2 is a schematic structure view of the enhanced-image reflective telescope according to another embodiment of the present application.

As shown in FIG. 2, the enhanced-image reflective telescope may further include: the light-collecting mechanism. When the enhanced-image reflective telescope includes the lighting mechanism, the reflective secondary mirror is configured to deflect the optical axis by 90 degrees, reflect light within a first threshold wavelength range, and transmit light within a second threshold wavelength range.

Exemplarily, the first threshold wavelength range and the second threshold wavelength range can be pre-set to adjust the reflective secondary mirror. For example, the reflective secondary mirror may be adjusted to transmit infrared light and reflect visible light.

The concave reflective primary mirror is configured to reflect light onto the reflective secondary mirror.

The light-collecting mechanism is configured to collect light transmitted by the reflective secondary mirror.

Exemplarily, the light-collecting mechanism may include but is not limited to an infrared camera.

The processor is configured to receive and process an image obtained by the light-collecting mechanism, and output a processed image;

Exemplarily, the processor has an external interface that can receive information from external devices, including but not limited to image data, telescope positioning data, and encoder data.

The projection mechanism is configured to receive the image output by the processor and project the image onto the reflective secondary mirror.

The eyepiece is configured to provide visual observation of an imaging of reflected light from the reflective secondary mirror.

Optionally, the concave reflective primary mirror, the reflective secondary mirror, the projection mechanism and the light-collecting mechanism are arranged along a same straight line, and the projection mechanism is located between the reflective secondary mirror and the concave reflective primary mirror. The light-collecting mechanism and the projection mechanism are oriented towards the reflective secondary mirror and positioned on opposing sides of the reflective secondary mirror. The projection mechanism is disposed within a shadow area formed by the reflective secondary mirror under illumination, thereby avoiding interference with an original reflective optical path.

Optionally, the light-collecting mechanism includes an image sensing module.

The image sensing module includes a group of optical correction mirrors configured to correct imaging quality and achieve relatively uniform optical image quality across images generated by image sensors in the image sensing module, thereby resolving a problem of primary lens aberration.

Optionally, the image sensing module further includes a manual focusing mechanism or an automatic focusing mechanism.

Exemplarily, the image sensing module includes a CMOS image sensor chip or a CCD image sensor chip.

Optionally, the projection mechanism includes the microdisplay and the projection objective; wherein, the projection objective is configured to project the image from the microdisplay towards the reflective secondary mirror, so that the reflective secondary mirror reflects the image onto an imaging focal plane of the concave reflective primary mirror.

Optionally, the projection mechanism further includes a focusing mechanism configured to align the projected image of the microdisplay and an imaging of the concave reflective primary mirror in an optical axis direction through focal tuning.

Optionally, a position of the reflective secondary mirror is adjusted so that the reflective secondary mirror ceases to reflect light into the eyepiece, the enhanced-image reflective telescope is configured to enable photographic capabilities, and thus the reflective telescope is converted to be a photography device. Therefore, the reflective telescope is enabled to achieve multifunctionality.

It should be noted that the projection mechanism, the reflective secondary mirror and the light-collecting mechanism have relatively small volumes, and an obstruction of light can be ignored.

Exemplarily, the operating principle of the enhanced-image reflective telescope in this embodiment is as follows. The reflective secondary mirror is disposed at a middle of a barrel of the reflective telescope, the barrel receives natural light and converges the light onto the reflective secondary mirror, which transfers the light to the eyepiece, the reflective secondary mirror in the barrel may transmit infrared light and reflect visible light, the light-collecting mechanism obtains an infrared image and transmits the infrared image to the projection mechanism, allowing the projection mechanism to project the infrared image towards the reflective secondary mirror, this allows the light reflected by the reflective secondary mirror to be superimposed, resulting in the image observed through the eyepiece being two superimposed enhanced images.

Optionally, the reflective secondary mirror is adjusted so that a portion of visible light may be transmitted through transmissive reflective mirror. Subsequently, the projection mechanism projects towards the reflective secondary mirror to adjust the wavelength of the light after receiving the infrared images obtained by the light-collecting mechanism, the visible light of the wavelength transmitted by the reflective secondary mirror is bypassed. This facilitates an alignment of the infrared image and the visible light image, and facilitates a formation of the enhanced-image.

The present application provides the enhanced-image reflective telescope including: a reflective secondary mirror, configured to deflect an optical axis by 90 degrees; a concave reflective primary mirror, configured to reflect light onto the reflective secondary mirror; a processor, configured to receive data for processing and output a processed images; a projection mechanism, configured to receive the image output by the processor and project the image onto the reflective secondary mirror; an eyepiece, configured to provide visual observation of an imaging of reflected light of the reflective secondary mirror. The present application can achieve image enhancement of telescopes, achieving a telescope effect of mixed-reality (MR) image augmentation, without generating additional incident light loss, and making the images observed through the telescopes clearer.

The above description is only an explanation of preferred embodiments of the present application and the applied technical principles. It should be understood by those skilled in the art that the scope of the present application is not limited to technical solutions formed by specific combinations of the above technical features, and also covers other technical solutions formed by any combinations of the above technical features or their equivalent features without departing from the inventive concept. For example, a technical solution formed by replacing the above features with (but not limited to) technical features with similar functions disclosed in the present application.

6

What is claimed is:

1. An enhanced-image reflective telescope, comprising:
a concave reflective primary mirror configured to reflect observed light of the enhanced-image reflective telescope onto a reflective secondary mirror,
the reflective secondary mirror configured to reflect reflected light from the concave reflective primary mirror by 90 degrees into an eyepiece,
a processor,
a projection mechanism,
the eyepiece, and
a light-collecting mechanism,
wherein the reflective secondary mirror is configured to reflect light of a first wavelength range of the reflected light, and allow light of a second wavelength range of the reflected light to pass through the reflective secondary mirror, the light-collecting mechanism is configured to collect the light of the second wavelength range of the reflected light passing through the reflective secondary mirror, the processor is configured to receive the light of the second wavelength range of the reflected light from the light-collecting mechanism and process the light of the second wavelength range of the reflected light from the light-collecting mechanism into an image, the projection mechanism is configured to receive the image from the processor and project the image onto the reflective secondary mirror, and the eyepiece is configured to, after the image is reflected by the reflective secondary mirror onto the eyepiece, view both the light of the first wavelength range of the reflected light from the reflective secondary mirror and the image from the reflective secondary mirror.

2. The enhanced-image reflective telescope according to claim 1, wherein the concave reflective primary mirror, the reflective secondary mirror, and the projection mechanism are arranged along a same straight line, the projection mechanism is located between the reflective secondary mirror and the concave reflective primary mirror and oriented towards the reflective secondary mirror, and the projection mechanism is located within a shadow area formed by the reflective secondary mirror under light illumination.

3. The enhanced-image reflective telescope according to claim 1, wherein the concave reflective primary mirror, the reflective secondary mirror, the projection mechanism and the light-collecting mechanism are arranged along a same straight line, the projection mechanism is located between the reflective secondary mirror and the concave reflective primary mirror, the projection mechanism and the light-collecting mechanism are oriented towards the reflective secondary mirror and positioned on opposing sides of the reflective secondary mirror, and the projection mechanism is disposed within a shadow area formed by the reflective secondary mirror under illumination.

4. The enhanced-image reflective telescope according to claim 1, wherein a position of the reflective secondary mirror is adjusted so that the reflective secondary mirror ceases to reflect light into the eyepiece.

* * * * *